United States Patent [19]

Naruo et al.

[11] Patent Number: 4,871,456

[45] Date of Patent: Oct. 3, 1989

[54] STACKED FILTER CARTRIDGE WITH POROUS FILTER SUPPORT

[75] Inventors: Kyoichi Naruo; Sumio Ohtani; Masahiro Etoh; Ikuro Moriya, all of Kanagawa, Japan

[73] Assignee: Fuji Photo Film Co., Ltd., Kanagawa, Japan

[21] Appl. No.: 84,364

[22] Filed: Aug. 12, 1987

[30] Foreign Application Priority Data

Aug. 12, 1986 [JP] Japan .................................. 61-187910
Aug. 28, 1986 [JP] Japan .................................. 61-200179
Sep. 17, 1986 [JP] Japan .................................. 61-217304

[51] Int. Cl.⁴ ........................ B01D 13/00; B01D 29/04
[52] U.S. Cl. ............................... 210/321.84; 210/346; 210/484; 210/488; 210/497.2; 55/158; 55/485; 55/511

[58] Field of Search ............... 210/314, 317, 331, 339, 210/346, 347, 486, 487, 488, 321.64, 321.84, 497.01, 497.2; 55/158, 483, 485, 492, 511

[56] References Cited

U.S. PATENT DOCUMENTS

| 3,397,785 | 8/1968 | Jaruis et al. | 210/346 |
| 3,581,902 | 6/1971 | Bidler | 210/347 |
| 3,702,659 | 11/1972 | Clark | 210/486 |

Primary Examiner—Richard V. Fisher
Assistant Examiner—Wanda L. Millard
Attorney, Agent, or Firm—Sughrue, Mion, Zinn, Macpeak & Seas

[57] ABSTRACT

A filter cartridge for removing particles of the order of submicrons from a solution, comprising at least two filtering films laid in parallel with the inner peripheral portions bonded fixedly to an inner rim of the core and with the outer peripheral portions joined together, thus defining a path of a solution to be filtered, and providing a relatively large effective filtering area.

8 Claims, 3 Drawing Sheets

STACKED FILTER CARTRIDGE WITH POROUS FILTER SUPPORT

BACKGROUND OF THE INVENTION

1. Field of the Invention

This invention relates to a filter cartridge with a porous filtering film. It more particularly relates to a filter cartridge for precise filtration to remove particles and microbes of the order of submicrons, specifically smaller than 10 μm and preferably 1 μm. Such a filter is used for instance in the filtration of chemicals and for the preparation of purified water or pure water for pharmaceutical manufacture in the pharmaceutical manufacturing industry, in the preparation of purified water or pure water used for producing extremely purified water which is used for precise work in the electronic industry such as for manufacturing semiconductor devices, in the filtration required in the manufacture of alcoholic beverages in the food industry, or in the preparation of purified water or pure water for ultrapure water in laboratories.

2. Background of the Invention

One example of a filter cartridge with porous filtering films which is extensively employed in the art is a pleat type filter cartridge. The conventional filter cartridge has a pleated porous filtering film and a cylindrical filtering film structure which is extended in parallel with the folds of the porous filtering film. The inner and outer cylindrical walls of the structure are protected by using plastic members. Other plastic members are sealingly bonded to the ends of the cylindrical filtering film structure.

In the pleat type filter cartridge thus constructed, the effective filtering area per unitary volume can be made large and therefore the filtration per unitary time can be also made large. Thus, the pleat type filter cartridge is extensively employed in the abovedescribed industries or in laboratories.

The filter cartridge when used is set in a predetermined housing. However, recently a disposable filter cartridge (called "a capsule type filter cartridge") has been used in which the effective filtering area is of the order of 0.05 to 0.4 m$^2$ and the filtering film structure is integral with the housing. Such a filter has been used has been used in order to eliminate the operation of setting the filter cartridge in the housing or setting the filtering means on a filtering line in which small quantities of various solutions are filtered in short times with frequent change of filters. For the same purpose, a so-called "mini-filter-cartridge" is also used. The mini-filter-cartridge is used with a metal housing and has a small effective filtering area. The mini-filter-cartridge has a filtering part which is equal to or similar to that of the filtering film structure of the disposable filter cartridge and has a filtering film structure which uses a sealing part when combined with the housing.

The disposable filter cartridges and the mini filter cartridges are, in general, divided into two groups: a group of pleat type filter cartridges and a group of flat-plate-laminated filter cartridges. In the latter type, as disclosed by Japanese Patent Application (OPI) No. 129016/1981 (the term "OPI" as used herein means an "unexamined published application"), flat plate type filtering units are laminated.

The construction and the manufacturing methods of the disposable filter cartridges and the mini filter cartridges classified in the group of pleat type filter cartridges are fundamentally equal to those of the above-described pleat type filter cartridge which is used together with the housing. The manufacture of the pleat type disposable filter cartridges additionally includes a manufacturing step in which a filtering film structure formed is inserted into a plastic housing.

The construction and the manufacturing method of the flat-plate-laminated filter cartridges including the disposable filter cartridges and the mini filter cartridges are fundamentally as follows (see the aforementioned Japanese Patent Application (OPI) No. 129016/1981).

The flat plate type filtering unit, which is a fundamental component of the filter cartridge, is formed as follows. Two filtering films each having circular of polygonal inner or outer peripheries (the films being annular and coaxial when the inner and outer peripheries are circular) are bonded to a flat-plate-shaped supporting member having parallel surface at the inner and outer peripheries. The parallel surfaces may be formed by bonding two moldings together as the case may be. When necessary, there may be additional bonding between the filtering films and the supporting members at other predetermined points. In this connection, it is essential that the inner peripheral portions and the outer peripheral portions are respectively bonded together so that they are liquid tight.

The flat-plate-shaped supporting member is so designed that bonding the two filtering films to the two sides of the supporting member forms an internal space which serves as a path of a solution filtered. More specifically, the supporting member is of a frames structure supporting the two filtering films from inside and having an opening at the center to allow the filtered solution to flow to the central region of the filtering unit.

A filtering film structure is formed by stacking a plurality of flat-plate-type filtering units with bonding means provided at the centers of the filtering units. For protection of the filtering films, an upper protective plate is provided over the stack of filtering units with a predetermined space therebetween. For the same purpose, and, in the case of the mini filter cartridge, a lower protective plate is provided for the additional purpose of positively setting the housing. The filtering film structure thus formed is bonded to the housing in the case of manufacture of the disposable filter cartridge and it is coupled to a sealing member having a groove with which a sealing part such as an O-ring is engaged to set the cartridge in the housing.

What is required for these disposable or mini filter cartridges is, for instance, described as follows. They should have a large filtering area per unit volume, that is, their filtering modules should be compact. The filtration should be achieved with a small filtering pressure. They should have high filtration accuracy, and must be so designed as to be readily connected to or disconnected from the filtering line. Furthermore, they should be so designed that the porous filtering films are protected from damage when rubbed or subjected to shock during handling, and the quantity of solution remaining at the end of the filtration should be less.

However, in the conventional flat-plate type filtering unit, as disclosed for instance by Japanese Unexamined Patent Application Publication (OPI) No. 129016/1981, the flat-plate-shaped supporting member has a number of coaxial ribs and channels, and the filtering films are bonded to the ribs. Therefore, the parts of the filtering films bonded to the ribs cannot filter a solution. That is, the flat-plate type filtering unit suffers from difficulty that these parts are larger in area than the remaining part. That is, the effective filtering area is small.

In the filter in which the filtering films are bonded to the two surfaces of the flat-plate shaped supporting member at a number of points, the filtering films are liable to be strained with the result that it is difficulty to keep the outer and inner peripheral portions liquid-tight between the supporting member and the filtering films. In the case of a flat-plate type filtering unit which is compact, its manufacture is rather difficult in requiring a number of manufacturing steps with the result that it is high in manufacturing cost and is low in liquid tightness and accordingly in reliability. Furthermore in the case where the flat-plate-shaped supporting member is intricate in structure as in that disclosed by the above-described Japanese Patent Application in which the path of a solution is defined by a number of ribs and channels, the filtration resistance is so high that the solution cannot smoothly flow and the removal of the residual air or solution cannot be achieved with ease. In addition, the supporting member is rather high both in manufacturing cost and in assembling cost.

As was described above, the flat-plate-shaped supporting member has a number of coaxial ribs and channels, and the filtering films are bonded to the ribs. Therefore, when pressure is applied to the filtering unit from its secondary side of filtration for back washing or other purposes, the filtering films will be expanded towards the primary side of filtration, and would be stretched up if stretchable. At worst, they may become detached from the supporting member.

If, in the case where the central portions of flat-plate type filtering units are bonded to one another to stack the filtering units, the filtering units are inclined with respect to one another, then they may be brought into contact with one another. This difficulty may be overcome by increasing the distance of lamination of the filtering units. However, the method raises another problem that the volume of the resultant filter cartridge is increased.

SUMMARY OF THE INVENTION

Accordingly, an object of this invention is to eliminate the above described difficulties accompanying a conventional filter cartridge.

More specifically, an object of the invention is to provide a filter cartridge having a filtering film structure in which the filtering films are large in effective filtering area and high in the reliability of its liquid tightness.

A further object is to provide a filter cartridge which is simple in construction and can be readily manufactured.

The foregoing object and other objects of the invention have been achieved by the provision of a flatplate laminated filter cartridge which, according to a first aspect of the invention, comprises at least two filtering films laid one on another. The two filtering films have inner peripheral portions joined fixedly to an inner rim and have outer peripheral portions sealingly joined together in such a manner as to define a space serving as a path of solution to be filtered.

Furthermore, the above-described object and other objects of the invention have been achieved by the provision of a flat-plate laminated filter cartridge comprising at least one filtering unit, in which, accordingly to a second aspect of the invention, the filtering unit comprises upper and lower filtering films arranged in parallel. The upper and lower filtering films have inner and outer peripheral portions secured to an inner rim and an outer rim of the filtering unit, respectively. The filtering unit further comprises a film supporting member of paper, unwoven cloth or net interposed between the upper and lower filtering films.

In addition, these objects of the invention have been achieved by the provision of a flat-plate laminated filter cartridge comprising at least one filter unit, in which, according to a third aspect of the invention, the filtering unit comprises upper and lower filtering films bonded only to the inner and outer rims of the filtering unit. Film supporting members of paper, unwoven cloth or net are disposed on both sides of the filtering unit.

The nature, principle and utility of the invention will become more apparent from the following detailed description when read in conjunction with the accompanying drawings.

BRIEF DESCRIPTION OF THE DRAWINGS

In the accompanying drawings.

DETAILED DESCRIPTION OF THE INVENTION

Preferred embodiments of this invention will be described with reference to the accompanying drawings.

Figure 1:
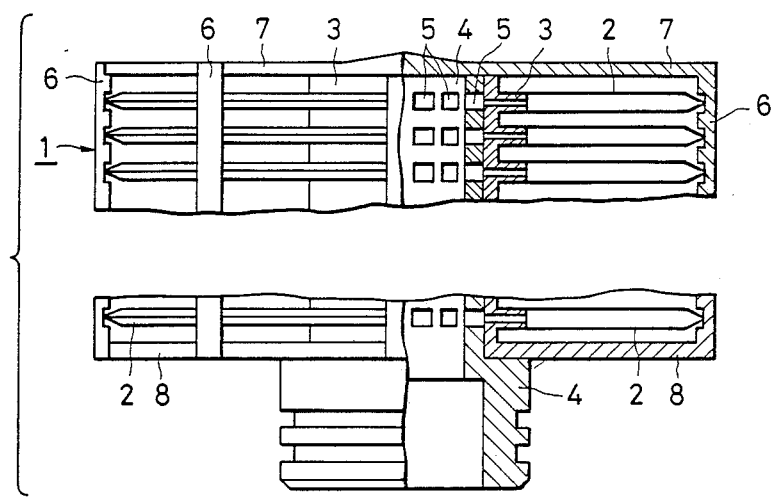
FIG. 1 is a side view, with parts cut away, showing essential components of a first example of a filter cartridge according to this invention.
Figure 2:
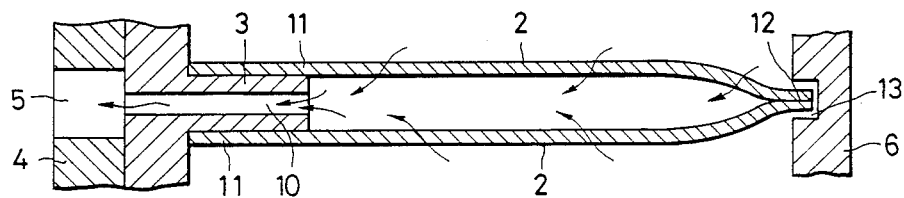
FIG. 2 is an enlarged sectional view showing a part of the filter cartridge shown in FIG. 1.

FIG. 1 shows essential components of a first embodiment of the invention. More specifically, FIG. 1 is a sectional view, with part cut away, of a filtering film structure 1 in a plate-laminated filter cartridge. FIG. 2 is an enlarged view of a part of the structure 1.

As shown in FIG. 1, the filtering film structure 1 is formed by stacking a plurality of flat plate type filtering film units each of which is made up of upper and lower filtering films 2 which are for instance in the form of a disk. The structure 1 has a core 4 which extends along the central axis and has radial communicating holes 5. Inner cylindrical rims 3, to each of which two filtering films 2 are fastened, are formed to be attached to the cylindrical wall of the core 4. The structure 1 further has upper and lower protective plates 7 and 8 at the top and bottom, respectively, which are used for protection of the filtering films 2. Outer cylindrical ribs 6 extend between the upper and lower protective plates 7 and 8 and are so shaped as to support the filtering film units arranged at suitable intervals.

As shown best in FIG. 2, which illustrates a flat plate type filtering film unit, inner peripheral portions 11 of two filtering films 2 are secured respectively to the upper and lower surface of the rim 3. The outer peripheral portions 12 are joined together in a sealed joint. The joining width in the radial direction of the outer peripheral portions 12 is not particularly limited. However, it is desirable that the width is determined by taking into consideration liquid tightness and the reduction of the effective filtering area due to the joining. The width is preferably 0.1 to 5 mm. The filtering film unit can be improved in stiffness by increasing the joining width of the outer peripheral portions 12 to a certain value. The outer peripheral portions 12 thus joined together are inserted into a recess 13 formed in the rib 6 which is, for instance, rectangular in section. As a result, the position of the flat plate type filtering film unit in the direction of the thickness can be regulated. This arrangement can prevent the deformation of the flat plate type filtering film unit even when the filtering films 2 have relatively low stiffness.

Materials for forming the rims 3, rib 6 and core 4 are not particularly limited. However, in view of manufacture, it is suitable to use plastic resins, particularly inert and rigid resins such as polyester, polycarbonate, polyoxymethylene resin, polyamide, phenylformaldehyde resin, fluororesin such as tetrafluoroethylene-perfluoroalkylvinyl ether copolymer, polychlorotrifluoroethylene, polypropylene, and polyethylene.

Each of the filtering films 2 is a so-called "membrane filter" of polysulfone which is porous. It is small in thickness, about 140 μm, but has a relatively high stiffness. Furthermore, it is high in mechanical strength, and is uniform in pore diameter distribution, and has high porosity so that it presents low filtration resistance. The filtering film unit can sufficiently withstand, for instance, liquid pressure even if the inner surfaces of the filtering films 2 are not finely reinforced with supports or the like. As was described above, the outer peripheral portions 12 of the filtering films 2 are joined together. This joining can be readily achieved by a method of using a solvent type adhesive, a method of using a radiation cross-linking type adhesive, a method of using a thermal cross-linking type adhesive, or a heat sealing method. That is, the upper and lower filtering films 2 are sealingly joined together with ease, and the filtering films' parts thus joined are extremely high in liquid tightness.

It goes without saying that, similarly as in the conventional filter cartridge, the lower end portion of the core 4 is so designed that it is coupled in a liquid-tight fashion to the housing (not shown) surrounding the structure 1.

In the filter cartridge with the filtering film structure 1 thus constructed, a solution to be filtered flows as indicated by the arrows in FIG. 2. The solution entering the housing (not shown) permeates the filtering films by the liquid pressure on the outside (primary side) of the upper and lower filtering films 2 so that impurities such as particles and microbes are removed by the whole region of the films 2 except for the inner and outer peripheral portions and then flows into the inside (secondary side). Thereafter, the filtered solution flows into central openings 10 formed in the rims 3 and the communicating holes 5 connected to the openings 10. Finally, the filtrate flows into the core 4 from the holes 5 so that it is discharged from the filter cartridge. Thus, the filtration has been achieved.

Figure 3:
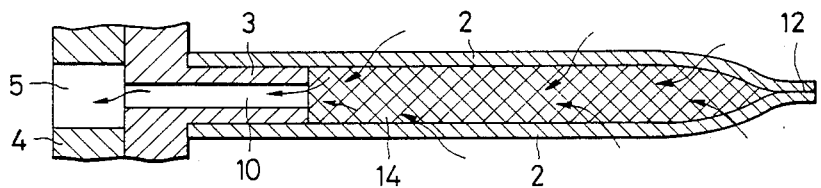
FIG. 3 is an enlarged sectional view showing a part of one modification of the filter cartridge shown in FIGS. 1 and 2.

In the above-described embodiment, the ribs 6 are employed to hold the outer peripheries of the filtering films 2 to thereby position the filtering films 2 in place and to improve the handling of the filtering film structure 1. However, the invention is not limited thereto or thereby. For instance, the structure 1 may be formed without the ribs 6. Although the above embodiments do not provide a film supporting member, as shown in FIG. 3, a film supporting member such as an unwoven cloth layer, paper or net 14 is preferably held between the upper and lower filtering films 2 which are combined together in the same manner as those in FIG. 2. It should be noted that the film supporting member 14 is not bonded to the inner surface of the filtering film 2. Also, the film supporting member 14 may be held on both outer sides of the upper and lower filtering films 2, or held therebetween together with on both outer sides. Therefore the effective area for filtration of each of the filtering film units is sufficiently large similarly as in the case of the filtering film unit shown in FIG. 2. Nonetheless the stiffness of the filtering films 2 is reinforced by the unwoven cloth layer 14. The material of the unwoven cloth layer 14 is not particularly limited. That is, any material suitable for precise filtration may be employed.

Figure 4:
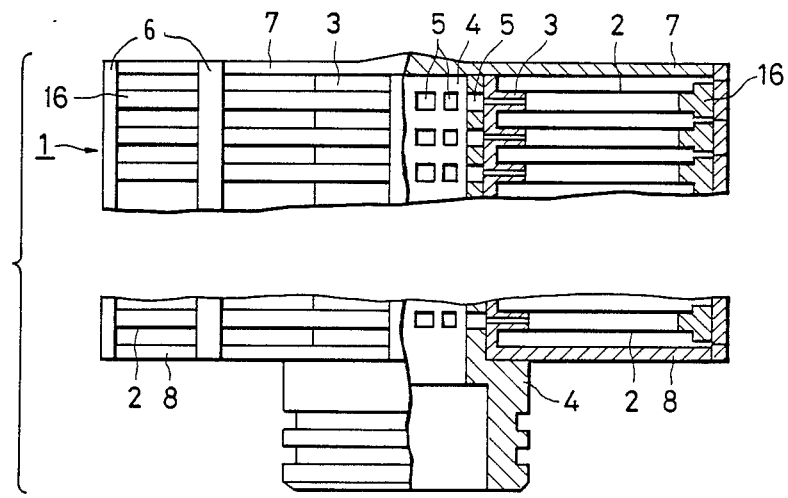
FIG. 4 is a side view, with parts cut away, showing essential components of a second example of the filter cartridge according to the invention.

A second example of the filter cartridge according to the invention is as shown in FIG. 4, in which those components which have been already described with reference to FIG. 1 are therefore designated by the same reference numerals.

In the filtering film structure 1, the upper and lower filtering films 2 of a filtering film unit are bonded to be liquid-tight at their outer peripheral portions 12 to an outer rim 16 in the form of a ring. The outer rim 16 is fixedly fitted in an annular coupling member which is wider than the outer rim 16. Therefore, when a plurality of filtering films are stacked one on another with the annular coupling members joined together, they can be positioned in place at suitable intervals between the upper and lower protective plates 7 and 8, thus providing a reinforced structure.

Figure 5:
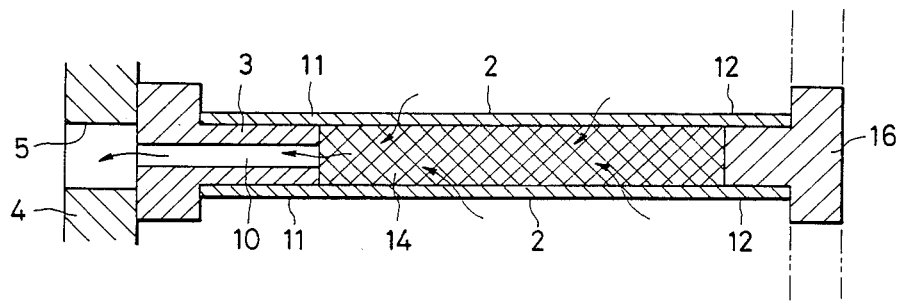
FIG. 5 is an enlarged sectional view of a part of the filter cartridge shown in FIG. 4.

FIG. 5 is an enlarged sectional diagram showing a part of a filtering film unit in the filtering film structure 1 of FIG. 4. The filtering film unit has upper and lower filtering films 2 arranged in parallel. The films 2 have inner peripheral portions 11 attached fixedly to the upper and lower surfaces of the respective inner rim 3 and outer peripheral portions 12 joined sealingly to the respective outer rim 16. A filtering film supporting member 14 of paper, unwoven cloth of net is held between the upper and lower filtering films 2. The joining widths (in the radial direction) of the inner and outer peripheral portions 11 and 12 are not particularly limited. However, the joining widths should be determined by taking into consideration liquid tightness and reduction of the effective filtering area due to the joining and is preferably 0.1 to 5 mm.

The filtering film supporting member 14 is not at all bonded to the upper and lower filtering films 2 and it is provided only to support the filtering films 2 from inside. Therefore, the effective filtering area can be made large, and the filtering film units can withstand a relatively high filtering pressure and can be assembled readily.

It goes without saying that the supporting member 14 may be bonded to the inner and outer rims 3 and 16.

The materials of the inner and outer rims 3 and 16, the upper and lower protective plates 7 and 8, and the core 4 in the filtering film structure 1 of FIG. 4 are not particularly limited. However, for convenience in manufacture, it is desirable to use plastic resins, particularly inert and rigid resins such as polyester, polycarbonate, polysulfone, polyvinylidene fluoride, polyoxymethylene resin, polyamide, phenyl-formaldihyde resin, polytetrafluoroethylene, fluororesin such as tetrafluoroethylene-perfluroroalkylvinyl ether copolymer, polychlorotrifoluoroethylene, polypropylene, and polyethylene.

Each of the filtering films 2 in the filtering film structure of FIG. 4 is a so-called "membrane filter" of thermoplastic resin which is porous. It is small in thickness, about 100 to 200 μm, but is relatively high in stiffness. Furthermore, it has high mechanical strength, and is uniform in pore diameter distribution, and high in porosity, so that it is low in filtration resistance. Therefore, the filtering film unit can sufficiently withstand, for instance, liquid pressure even if the inner surfaces of the filtering films 2 are not fully bonded to the supporting member. It goes without saying that the inner and outer peripheral portions 11 and 12 of the filtering films 2 of each unit can be joined to the respective rims by the methods which have been described with reference to the first embodiment shown in FIG. 1.

As was described above, the filtering film supporting member of paper, unwoven cloth or net is interposed between the upper and lower filtering films of each filtering film unit. The material of the unwoven cloth or net is not particularly limited. However, it is preferably polyester or polypropylene, and it is desirable to use long fibers. In view of this it is preferable to use those formed according to a span bond method. It is undesirable that the filtering film supporting member of unwoven cloth or net is bonded to the filtering films.

In the above-described embodiment shown in FIG. 4, the outer peripheral portions of the filtering films are sealingly supported by the rims. However, the other peripheral portions may be supported by the rims after being joined together. The configuration of the outer rims for supporting the outer peripheral portions of the filtering films and the method of supporting the outer peripheral portions may be modified freely if the modification will not greatly decrease the effective filtering area of the filtering film.

In the filter cartridge with the filtering film structure thus constructed, a solution to be filtered flows as indicated by the arrows in FIG. 5. The solution entering the housing (not shown) permeates the filtering films by the liquid pressure in the outside (primary side) of the upper and lower filtering films 2 so that impurities such as particles and microbes are removed by the whole region of the films 2 except for the inner and outer peripheral portions 11 and 12, and then flows into the inside (secondary side) thereof. Thereafter, the filtered solution flows into a plurality of central openings 10 formed in the inner rims 3, the communication holes 5 connected to the openings 10 and the hollow of the core 4, and it finally comes out of the filter cartridge. Thus, the filtration has been achieved.

As is apparent from the above description, in each of the filtering film units, the whole region of the filtering films 2 except for the inner peripheral portions 11 secured to the inner rim 3 and for the outer peripheral portions 12 is used for filtration. In the filter cartridge of the invention, unlike the conventional one with the flat plate type filtering units in which ribs or channels are arranged over the substantially entire region of each filtering film from the inner periphery to the outer periphery and the filtering films are bonded to the supports, the numbers of bonding and supporting points are less, so that the filtering area is increased as much, and the filtering pressure can be low. Furthermore, the filter cartridge of the invention, unlike the conventional one, has no supports which support the filtering films 2 from inside to thereby make the path of a solution intricate. Therefore, the solution flows smoothly, which minimizes the quantity of solution remaining at the end of the filtering operation. Thus, the removal of the remaining air or solution can be readily achieved.

Figure 6:
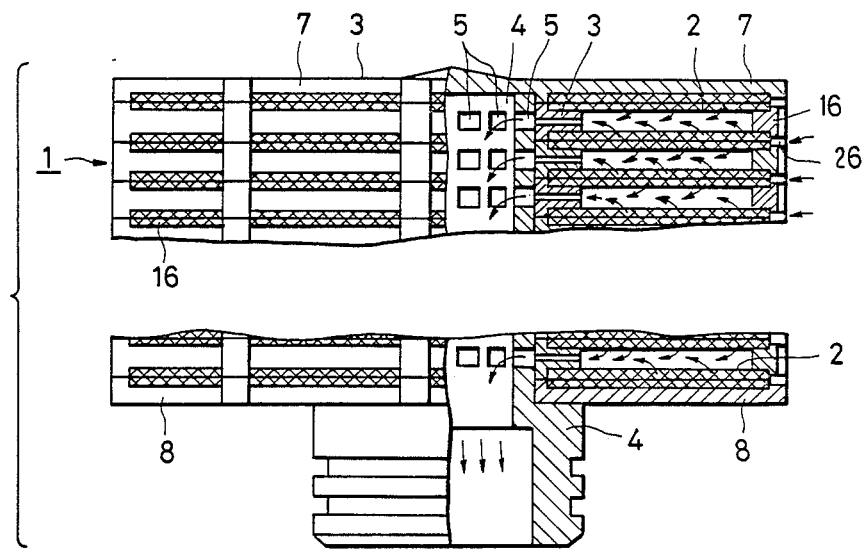
FIG. 6 is a side view, partially cut away, showing essential components of a third example of the filter cartridge according to the invention.

FIG. 6 is a sectional view showing essential components of a third example of the filter cartridge according to the invention.

Similarly as in the filtering film structure described with reference to FIG. 4, a filtering film structure 1 is made up of a plurality of flat-plate type filtering units stacked one on another. Each of the filtering units has upper and lower filtering films 2 having inner peripheral portions bonded to an inner rim 3 and outer peripheral portions bonded to an outer rim 16. Paper, unwoven cloth or net layers are placed on the primary sides, or outer surfaces, of the two filter films 2 of each filtering unit. The structure 1 has a core 4 extending along a central axis and having communicating holes 5. The inner rims 3, to each of which two filtering films 2 are bonded, are mounted on the core 4. The inner rims 3 are stacked and are held between upper and lower protective plates 7 and 8 for protection of the filtering films 2.

Figure 7:
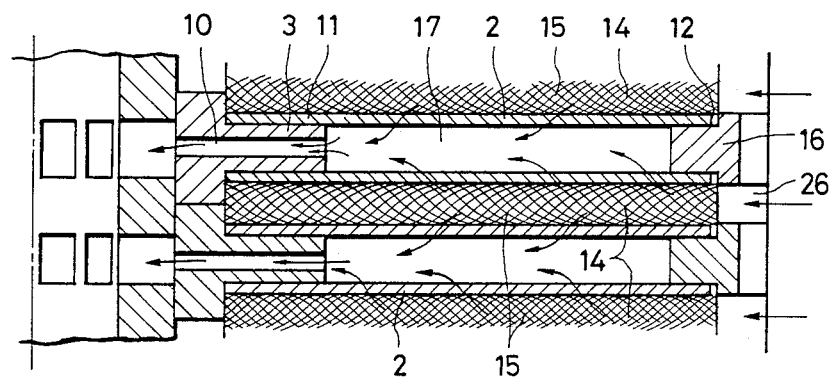
FIG. 7 is an enlarged sectional view of a part of the filter cartridge shown in FIG. 6.

As shown in FIG. 7, the filtering films 2 have the outer peripheral portions 12 bonded to be liquid-tight to the annular outer rims 16.

In each of the filtering units, the inner peripheral portions 11 of the upper and lower filtering films 2 are bonded to the upper and lower surfaces of the respective inner rim 3. The outer peripheral portions 12 are sealingly joined to the respective outer rim 16, as was described before. The bonding widths (in a radial direction) of the inner and outer peripheral portions 11 and 12 are not particularly limited. However, in view or liquid-tightness and reduction of the effective filtering area due to the bonding, it is desirable that the bonding widths are in a certain range, preferably 0.1 to 5 mm.

A specific feature of the filter cartridge thus constructed resides in that the paper, unwoven cloth or net layers 15 are interposed in the primary spaces formed between adjacent filtering unit. A layer 15 is provided between the upper filtering film 2 of a filtering unit and the lower filtering film 2 of another filtering unit laid on the first unit. The term "primary space" as used herein is intended to mean a space in the filter cartridge into which a solution to be filtered is supplied.

In the above-described embodiment, the upper and lower filtering films of each of the filtering units are in parallel. However, the invention is not limited thereto or thereby.

The technical concept of the invention is applicable not only to the case where the primary space is provided between the upper and lower filtering films of each filtering unit but also to the case where the primary space is provided between the filtering units.

Furthermore, the technical concept of the invention is applicable to the case where spokes connect the inner and outer rims 3 and 16 in the secondary space, i.e., between the upper and lower filtering films 2 of each filtering unit, and to the case where the paper, unwoven cloth or net layer is inserted in the secondary space.

The materials of the inner and outer rims 3 and 16, protective plates 7 and 8, and core 4 are not particularly limited. However, for convenience in manufacture, it is preferable to use plastic resins, particularly inert and rigid resins such as polyester, polycarbonate, polysulfone, polyvinylidene fluoride, polyoxymethylene resin, polyamide, phenyl-formaldihyde resin, polytetrafluoroethylene, fluororesin such as tetrafluoroethylene-perfluoroalkaylvinyl ether copolymer, and polychlorotrifluoroethylene. The filtering films 2 and porous films made of triacetylcellulose, polyvinylidene fluoride, polystylene, polyammide or polytetra-fluoroethylene. The filtering films 2 are small in thickness, 10 to 200 μm, and high in porosity, and therefore they are low in mechanical strength. This difficulty is sufficiently overcome according to the invention. However, the filtering films may be reinforced by spot-welding a net-shaped structure of synthetic resin. The material of the net-shaped structure is preferably polyester or polypropylene. The meshes of the net-shaped structure may be rectangular, hexagonal or octagonal in configuration.

In the filter cartridge of the invention, it is preferable to use polyester or polypropylene to form the unwoven cloth or net layers, and to employ long, stiff fibers manufactured by the span bond method.

In the invention, a method of bonding the filtering films to the inner and outer rims depends on the materials of these components. That is, similarly as in the case of the filter cartridge shown in FIG. 1, the method of using a solvent type adhesive, the method of using a thermal cross-linking type adhesive, or the heat sealing method may be employed for the bonding of the films to the rims. Thus, the upper and lower filtering films are sealingly bonded to the rims with ease, and the parts of the films thus bonded are high liquid-tightness.

It goes without saying that, similarly as in the conventional filter cartridge, the lower end portion of the core 4 is so designed that it is coupled liquid-tightly to the housing (not shown).

In the filter cartridge with the filtering film structure 1 thus constructed, a solution to be filtered flows as indicated by the arrows in FIG. 7. The solution entering the housing (not shown) flows into solution inlets 26 formed between the filtering units and passes through the paper, unwoven cloth or net layers 15 in the primary spaces 14 outside the upper and lower filtering films 2. The solution thus passed through permeates the filtering films 2 by the liquid pressure in the primary space so that impurities such as particles and microbes are removed by the whole region of the films 2 except the bonded parts of the inner and outer peripheral portions 11 and 12, and then flows into the inside (the secondary space) thereof. Thereafter, the solution flows into central openings 10 formed in the inner rims 3, and the communicating holes 5 connected to the openings 10. Finally, the solution flows into the core from the holes 5 so that it is discharged from the filter cartridge. Thus, the filtration has been accomplished.

As is apparent from the above description in each of the filtering units, the whole region of the filtering films 2 except the parts bonded to the inner and outer rims 3 and 16 is used for filtration. In the conventional filter cartridge with the flat plate type filtering units, ribs or channels are arranged over the substantially entire region of each filtering films, from the inner periphery to the outer periphery and the filtering films are bonded to the supports. On the other hand, in the filter cartridge of the invention, the number of bonding and supporting points are less so that the filtering area is increased as much and the filtering pressure can be reduced.

As the paper, unwoven cloth or net layers are inserted in the primary spaces of the filtering film structure, the filtering films can withstand the back pressure which occurs when the liquid supplying pump is stopped or can tolerate the cleaning of the filter cartridge. In the conventional filter cartridge, a number of filtering films are bonded to the support ribs in the filtering units to withstand the back pressure, resulting in a great reduction of the effective filtering area. This difficulty has been overcome by supporting the filtering films with the paper, unwoven cloth or net layers inserted in the primary spaces of the cartridge according to the invention.

Figure 8:
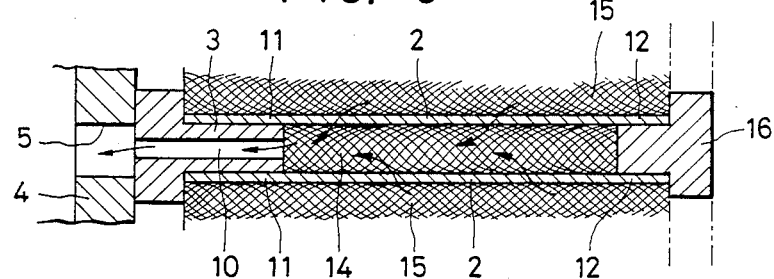
FIG. 8 is an enlarged sectional view of a part of the filter cartridge according to the invention.

In the above-described embodiments, although the paper, unwoven cloth or net layers is held between the upper and lower filtering films, or held on both outer sides thereof, it should be noted that they may be held therebetween together with on both outer sides thereof, as shown in FIG. 8.

As was described above, in the filter cartridge of the invention, at least two plate type filtering films are sealingly bonded at the outer periphery. Also, the filter cartridge has the inner peripheral portions bonded fixedly to the inner rim so that the first and second spaces are provided for the flow of a solution to be filtered. Furthermore, the filter cartridge of the invention has eliminated the difficulty of the conventional filter cartridge that the inner surfaces of the filtering films are bonded substantially in its entirety to the supports. Therefore, the filter cartridge of the invention has a large effective area for filtration. Furthermore, as the solution can smoothly flow through the cartridge, the cartridge manifest a long service life and the filtering pressure can be low.

In addition, in the filter cartridge of the invention, the filtering film supporting structure is simple, and the filtering film units can be readily manufactured to be reliably liquid tight at the bonding portion of the filtering films, as the flow path of a solution to be filtered is simple, the removal of the remaining air or solution can be readily achieved.

Thus, the flat-plate laminated filter cartridge provided according to the invention can be readily assembled, and is large in effective filtering area, small in filtering pressure and excellent in liquid tightness. Furthermore, it is suitable for reduction of size and weight, and it is low in manufacturing cost and can achieve filtration with high accuracy.

In the flat-plate type filter cartridge comprising one or a plurality of stacked filtering units, according to one embodiment of the invention, each of the filtering units comprises the upper and lower filtering films disposed in parallel. Paper, unwoven cloth or net layer is laid between the two filtering films to support the films in such a manner that it is not bonded to the filtering films. Therefore, the filtering films are large in effective filtering area, and the service life of each filter film is long, and the filtering pressure can be low.

Furthermore, in the flat-plate type filter cartridge comprising one or a plurality of stacked filtering units, according to another embodiment of the invention, each of the filtering units comprises the upper and lower filtering films bonded only to the inner and outer rims. The paper, unwoven or net layers are disposed in the primary spaced defined by the upper and lower filtering films. In the filter cartridge, as the filtering films are bonded only to the inner and outer rims, the effective filtering area of each filtering film is large. Therefore, the filtering films can sufficiently withstand the back pressure which takes place in the cleaning operation. This will lengthen the service life of the filter cartridge and reduce the running cost.

What is claimed is:

1. A flat-plate laminated filter cartridge, comprising at least one filtering unit, in which said filtering unit comprises:

an inner rim;

an outer member surrounding an outer periphery of and spaced apart from said inner rim;

upper and lower filtering films extending between said inner rim and said outer member and each having an entire inner periphery which is bonded to said inner rim, and an entire outer periphery which is bonded to at least one of another said outer periphery and said outer member so as to form a space therebetween serving as a path of a solution to be filtered; and at least one film supporting member made of one of paper, unwoven cloth and net, disposed on at least one of both sides of said upper and lower filtering films, and between said upper and lower filtering films.

2. A flat-plate laminated filter cartridge as claimed in claim 1, wherein said upper and lower filtering films are arranged in parallel.

3. A flat-plate laminated filter cartridge as claimed in claim 1, wherein said inner rim does not extend radially outwardly over a filtering area of said upper and lower filtering films.

4. A flat-plate laminated filter cartridge as claimed in claim 1, wherein said inner rim includes radial holes communicating with said space.

5. A flat-plate laminated filter cartridge as claimed in claim 1, wherein there is no rigid connection between said inner rim and said outer member in said space.

6. A flat-plate laminated filter cartridge as claimed in claim 5, wherein said inner rim has radial holes communicating with said space.

7. A flat-plate laminated filter cartridge as claimed in claim 1, comprising a plurality of said filtering units.

8. A flat-plate laminated filter cartridge as claimed in claim 7, wherein in each of said filtering units said upper and lower filtering films have their said entire outer peripheries bonded together in a set and wherein said outer member extends in parallel with said inner rim and has a plurality of recesses each receiving a respective one of said sets of said bonded together outer peripheries.

* * * * *